United States Patent Office 3,122,544
Patented Feb. 25, 1964

3,122,544
4-AMINO-2-ARYL-6H-INDENO(2,3-g)-
PTERIDIN-6-ONES
Thomas S. Osdene, West Chester, and Arthur A. Santilli, Ardmore, Pa., assignors to American Home Products Corporation, New York, N.Y., a corporation of Delaware
No Drawing. Filed Nov. 13, 1962, Ser. No. 237,309
2 Claims. (Cl. 260—251.5)

This invention is concerned with novel pteridine derivatives having valuable antiviral properties, and which may be administered orally or parenterally.

More specifically, the present invention relates to 4-amino-2-aryl-6H-indeno(2,3-g)pteridin-6-ones having the following general formula:

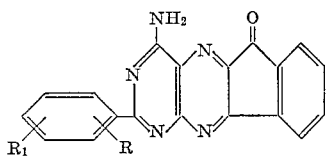

where R and $R_1$ are of hydrogen, lower alkyl, lower alkoxy, or halogen having an atomic weight less than 80.

In the chemical name of the compounds sought to be patented, the letter "g" locates the points of attachment of the indene moiety to the pteridine ring.

The compounds of the invention may be prepared by any one of several methods. According to one procedure, these compounds are prepared by reacting a 4,6-diamino-5-nitroso-2-arylpyrimidine with a 1,3-indanedione. This reaction is generally carried out above room temperature and under autogenous pressure. When carried out in the absence of a solvent, the reaction temperature range is from about 100° to 200° C. This reaction also may be carried out in the presence of an organic solvent such as glacial acetic acid containing a small amount of anhydrous sodium acetate or potassium acetate, in which case the reaction temperature ranges from 60° to 130° C. This reaction results in the condensation of the reactants and in the production of a 4-amino-2-aryl-6H-indeno(2,3-g)pteridin-6-one, which is treated with a lower alkanol solvent and then filtered. The filtered product can be recrystallized from a suitable solvent such as dimethylformamide. The reaction is illustrated below:

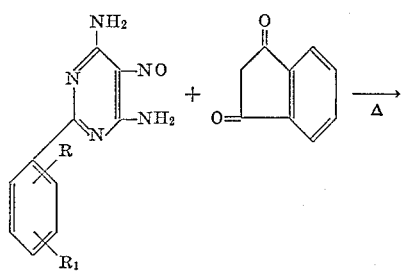

The following examples illustrate the best mode of carrying out the invention.

Example 1

An intimate mixture of 6.45 g. of 4,6-diamino-5-nitroso-2-phenyl-pyrimidine and 4.8 g. of 1,3-indanedione was placed in a flask and immersed in an oil bath maintained at 135° C. A vigorous reaction occurred and after a few minutes evolution of steam ceased. The flask was removed from the bath and the product which solidified was treated with 50 ml. of hot ethanol and removed by filtration. Recrystallization from dimethylformamide afforded 4-amino-2-phenyl-6H-indeno(2,3-g)pteridin-6-one, M.P. 360° C.

*Analysis.*—Calculated: C=70.10, H=3.38, N=21.36. Found: C=70.02, H=3.51, N=21.51.

Example 2

Reaction of 7.48 g. of 4,6-diamino-2-(p-chlorophenyl)-5-nitrosopyrimidine with 4.8 g. of 1,3-indanedione yields 4-amino-2-(p-chlorophenyl)-6H-indeno(2,3-g)pteridin-6-one by following essentially the procedure of Example 1.

Example 3

Reaction of 7.35 g. of 4,6-diamino-2-(p-methoxyphenyl)-5-nitrosopyrimidine with 4.8 g. of 1,3-indanedione gives 4-amino-2-(p-methoxyphenyl)-6H-indeno(2,3-g)-pteridin-6-one by following essentially the procedure of Example 1.

Example 4

Reaction of 6.87 g. of 4,6-diamino-5-nitroso-2-(p-tolyl-pyrimidine) with 4.8 g. of 1,3-indanedione yields 4-amino-2-p-tolyl-6H-indeno(2,3-g)pteridin-6-one by following essentially the procedure of Example 1.

Example 5

Reaction of 6.45 g. of 4,6-diamino-2-(3,4-dichlorophenyl)-5-nitrosopyrimidine with 4.8 g. of 1,3-indanedione yields 4-amino-2-(3,4-dichlorophenyl)-6H-indeno(2,3-g)-pteridin-6-one by following essentially the procedure of Example 1.

Example 6

Reaction of 6.87 g. of 4,6-diamino-2-(o-tolyl)-5-nitrosopyrimidine with 4.8 g. of 1,3-indanedione yields 4-amino-2-o-tolyl-6H-indeno(2,3-g)pteridin-6-one by following essentially the procedure of Example 1.

The foregoing compounds are pharmacologically useful as antiviral agents and are especially effective, in mammals, against herpes simplex.

It should be understood that the present disclosure is merely illustrative of the invention and in no wise limits the same. Furthermore, the invention comprehends such modification as will fall within the scope of the following claims. Similarly, the scope of the invention encompasses the combination of the compounds sought to be patented with solid or liquid inert pharmaceutically acceptable carriers.

What is claimed is:
1. A compound of the formula

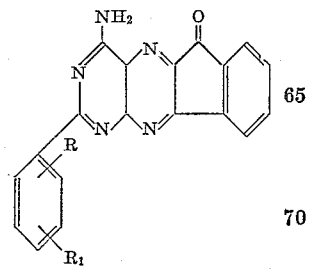

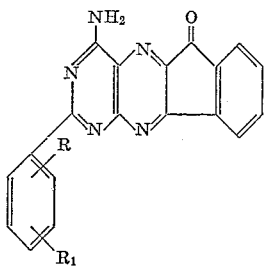

wherein R and $R_1$ are members of the group consisting of hydrogen, lower alkyl, lower alkoxy, and halogen having an atomic weight less than 80.

2. 4-amino-2-phenyl-6H-indeno-(2,3-g)pteridin-6-one.

References Cited in the file of this patent

Timmis: Nature, vol. 164 (1949), page 139.

Spickett et al.: J. Chem. Soc., London (1954), pages 2887–95 at pages 2887–8.

Webster's Third New International Dictionary (1961), page 1369.

Conn (Editor): Current Therapy (1962), page 439, published by Saunder and Co.